US011636001B2

(12) United States Patent
Bhandary (10) Patent No.: US 11,636,001 B2
(45) Date of Patent: Apr. 25, 2023

(54) METHOD AND SYSTEM FOR DETERMINING AN ERROR THRESHOLD VALUE FOR MACHINE FAILURE PREDICTION

(71) Applicant: AVANSEUS HOLDINGS PTE. LTD., Bugis Junction (SG)

(72) Inventor: Chiranjib Bhandary, Bangalore (IN)

(73) Assignee: Avanseus Holdings Pte. Ltd., Bugis Junction (SG)

( * ) Notice: Subject to any disclaimer, the term of this patent is extended or adjusted under 35 U.S.C. 154(b) by 1019 days.

(21) Appl. No.: 16/392,709

(22) Filed: Apr. 24, 2019

(65) Prior Publication Data

US 2020/0301769 A1    Sep. 24, 2020

(30) Foreign Application Priority Data

Mar. 20, 2019    (IN) .............................. 201911010877

(51) Int. Cl.
*G06N 3/08* (2023.01)
*G06F 11/07* (2006.01)

(52) U.S. Cl.
CPC .......... *G06F 11/076* (2013.01); *G06F 11/073* (2013.01); *G06N 3/08* (2013.01)

(58) Field of Classification Search
CPC ........ G06N 3/08; G06N 3/0445; G06N 3/084; G06F 11/073; G06F 11/076
See application file for complete search history.

(56) References Cited

U.S. PATENT DOCUMENTS 10,382,799 B1 * 8/2019 Walters ................ G06K 9/6267
2011/0106734 A1 * 5/2011 Boult .................... G06K 9/6292
714/E11.02

(Continued)

OTHER PUBLICATIONS

Xu, C., Wang, G., Liu, X., Guo, D., & Liu, T. Y. (2016). Health status assessment and failure prediction for hard drives with recurrent neural networks. IEEE Transactions on Computers, 65(11), 3502-3508. (Year: 2016).*

(Continued)

*Primary Examiner* — Ying Yu Chen
*Assistant Examiner* — Lokesha G Patel
(74) *Attorney, Agent, or Firm* — Renner, Otto, Boisselle & Sklar, LLP (57) ABSTRACT

Embodiments of the invention provide a method and system for determining an error threshold value when a vector distance based error measure is to be used for machine failure prediction. The method comprises: identifying a plurality of basic memory depth values based on a target sequence to be used for machine failure prediction; calculating an average depth value based on the plurality of basic memory depth values; retrieving an elementary error threshold value, based on the average depth value, from a pre-stored table which is stored in a memory and includes a plurality of mappings wherein each mapping associates a predetermined depth value of an elementary sequence to an elementary error threshold value; and calculating an error threshold value corresponding to the target sequence based on both the retrieved elementary error threshold value and a standard deviation of the plurality of basic memory depth values.

14 Claims, 8 Drawing Sheets

(56) References Cited

U.S. PATENT DOCUMENTS

2018/0046149 A1* 2/2018 Ahmed .................. G06N 20/20
2021/0002728 A1* 1/2021 Landau .................. G16B 20/00

OTHER PUBLICATIONS

Salfner, F., Lenk, M., & Malek, M. (2010). A survey of online failure prediction methods. ACM Computing Surveys (CSUR), 42(3), 1-42. (Year: 2010).*

Chigurupati, A., Thibaux, R., & Lassar, N. (Jan. 2016). Predicting hardware failure using machine learning. In 2016 Annual Reliability and Maintainability Symposium (RAMS) (pp. 1-6). IEEE. (Year: 2016).*

Fronza, I., Sillitti, A., Succi, G., Terho, M., & Vlasenko, J. (2013). Failure prediction based on log files using random indexing and support vector machines. Journal of Systems and Software, 86(1), 2-11. (Year: 2013).*

Wang, Z., Zhang, M., Wang, D., Song, C., Liu, M., Li, J., . . . & Liu, Z. (2017). Failure prediction using machine learning and time series in optical network. Optics Express, 25(16), 18553-18565. (Year: 2017).*

Chong, Y. S., & Tay, Y. H. (Jun. 2017). Abnormal event detection in videos using spatiotemporal autoencoder. In International symposium on neural networks (pp. 189-196). Springer, Cham. (Year: 2017).*

Graves, A. (2012). Sequence transduction with recurrent neural networks. arXiv preprint arXiv:1211.3711. (Year: 2012).*

Li, S (2018). Independently Recurrent Neural Network (IndRNN): Building A Longerand Deeper RNN. https://arxiv.org/abs/1803.04831 (Year: 2018).*

* cited by examiner

| Input sequence | 1 | 0 | 0 | 0 | 1 | 0 | 0 | 1 | 0 | 0 | 1 | 0 | 0 | 0 | 0 |
|---|---|---|---|---|---|---|---|---|---|---|---|---|---|---|---|
| Predicted sequence | | .05 | .04 | .04 | .96 | .02 | .04 | .95 | .02 | .04 | .98 | .01 | .03 | .02 | .02 |

Figure 2C 1 0 ........ ........0 1 0............ ... 0 1
    $\underbrace{\phantom{XXXXXX}}_{\text{50 zeroes}}$  $\underbrace{\phantom{XXXXXX}}_{\text{50 zeroes}}$ 0.974 0.026 ........ 0.026 0.974 0.026 ........ 0.026 0.974
       $\underbrace{\phantom{XXXXXXXXX}}_{50}$     $\underbrace{\phantom{XXXXXXXXX}}_{50}$

METHOD AND SYSTEM FOR DETERMINING AN ERROR THRESHOLD VALUE FOR MACHINE FAILURE PREDICTION

FIELD OF INVENTION

The invention relates to machine failure prediction techniques, especially, a method and system for determining an error threshold value when a vector distance based error measure is to be used for modelling an arbitrary sequence of machine failure history, for example, a sequence having a plurality of different inter-failure gaps.

BACKGROUND

It is very important to be able to accurately predict machine failures/faults as such prediction allows a user to take preventive actions to avoid potential machine failures, or at least make alternative arrangements to eliminate or reduce the negative impact caused by potential machine failures. This is particularly critical for machines involved in providing basic services such as tele-communication, transportation etc., since unavailability of service may cause serious inconvenience and loss of reputation of service providers and sometimes may invite legal action. Further, machine failure prediction may also reduce maintenance costs since preventive actions typically lead to less site visits and costs associated therewith.

The essence of machine failure prediction is to model past machine failures in terms of past occurrences and perceived factors, such as temperature, age of components, load on the machine, etc. With sufficient training or adjustment of parameters, when the model is able to reproduce the past sequence of failures with high accuracy, e.g. 95%, the same model will be used to predict future machine failures. Specifically, machine failure prediction is essentially a sequence modelling problem, i.e. a problem to predict failures over certain future duration, e.g. 1 week, based on a sequence of past failure occurrences along with affecting parameters over certain period in the past, e.g. 6 months.

Recurrent Neural Network (RNN) has been widely used for machine failure prediction since RNN can model any sequence involving functional and temporal relationships. One of the central decisions to be made while using RNN for machine failure prediction is to select the error measurement metric and error threshold value while judging convergence of the RNN. If the error threshold value is too high, the prediction will not be proper; whereas if the error threshold value is too low, the network may take a very large number of epochs, i.e. very long time, for convergence or the network may not converge at all. Non-convergence due to low error threshold value setting is a common phenomenon in RNN.

A proper error threshold value may be obtained by a trial and error method, i.e. solving each problem many times with different error values. However, the calculation process has to be repeated every time when the problem changes. As many machine failure sequences, typically in the range of 50,000 or so, are to be modelled on a daily basis in industrial settings and each sequence may have different pattern, the trial and error method for determining an error threshold value would not be applicable. Further, an average error threshold value which obtained by solving many sequences based on a trial and error method, may be used for machine failure prediction. However, the average error threshold value will create uncertainty on convergence of the network and increase the convergence time. Both of these problems should be avoided from quality and timely delivery perspectives of machine failure prediction.

Currently, there is no available/effective solution for determining an error threshold value for arbitrary machine failure prediction in existing technology. The only way to continuously run machine failure prediction for mass scale prediction like machine failures is to estimate error threshold value based on experience. However, non-convergence may result from this manual prediction method.

SUMMARY OF INVENTION

Embodiments of the invention propose an effective solution for determining an error threshold value when a vector distance based error measure proposed by embodiments of this invention is to be used for modelling an arbitrary sequence of machine failure history using RNN for the purpose of predicting future failures, especially modelling a sequence having a plurality of different inter-failure gaps.

According to one aspect of the invention, a method for determining an error threshold value when a vector distance based error measure is to be used for machine failure prediction is provided. The method comprises:

identifying, by a first processor in a first computer system, a plurality of basic memory depth values based on a target sequence to be used for machine failure prediction;

calculating, by the first processor, an average depth value based on the plurality of basic memory depth values;

based on the average depth value, retrieving, by the first processor, an elementary error threshold value from a pre-stored table which is stored in a memory and includes a plurality of mappings wherein each mapping associates a predetermined depth value of an elementary sequence to an elementary error threshold value; and calculating, by the first processor, an error threshold value corresponding to the target sequence based on both the retrieved elementary error threshold value and a standard deviation of the plurality of basic memory depth values.

According to a second aspect of the invention, a system for determining an error threshold value when a vector distance based error measure is to be used for machine failure prediction is provided. The system comprises: a first computer system having a first processor and a memory communicably coupled thereto, wherein the memory is configured to store data to be executed by the first processor, wherein the first processor is configured to identify a plurality of basic memory depth values based on a target sequence to be used for machine failure prediction;

calculate an average depth value based on the plurality of basic memory depth values;

based on the average depth value, retrieve an elementary error threshold value from a pre-stored table which is stored in a memory and includes a plurality of mappings wherein each mapping associates a predetermined depth value of an elementary sequence to an elementary error threshold value; and calculate an error threshold value corresponding to the target sequence based on both the retrieved elementary error threshold value and a standard deviation of the plurality of basic memory depth values.

According to a third aspect of the invention, a method for machine failure prediction using a RNN is provided. The method comprises calculating, by a processor, a vector distance between an input sequence and a current predicted sequence at end of each epoch in the RNN;

comparing the calculated vector distance with a predetermined error threshold value to determine whether a predetermined convergence condition is satisfied, and stopping RNN training if the predetermined convergence condition is satisfied.

According to a fourth aspect of the invention, a non-transitory computer readable medium is provided. The computer readable medium comprises computer program code for determining an error threshold value when a vector distance based error measure is to be used for machine failure prediction, wherein the computer program code, when executed, is configured to cause a processor in a computer system to perform a method proposed by embodiments of the invention.

BRIEF DESCRIPTION OF THE DRAWINGS

The invention will be described in detail with reference to the accompanying drawings, in which:

FIG. 1C (a) shows an example of a sequence of machine failure history; FIG. 1C (b) shows an input sequence and a corresponding predicted sequence at the end of an epoch when RNN is used for machine failure prediction;

DETAILED DESCRIPTION OF EMBODIMENTS OF THE INVENTION

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention.

Figure 1A:
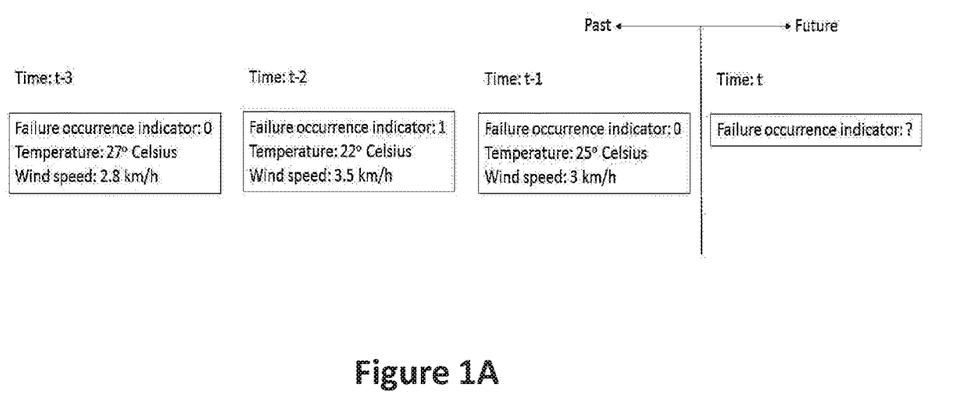
FIG. 1A is a schematic diagram illustrating an input to RNN for future machine failure prediction and an output of the machine failure prediction.

FIG. 1A is a schematic diagram illustrating an input to RNN for future machine failure prediction and an output of the machine failure prediction. As shown in FIG. 1A, the input includes the failure occurrence indicators as well as the temperature and wind speed at time stamps t−3, t−2 and t−1, and the output of the machine failure prediction is the predicted failure occurrence indicator at time stamp t. The failure occurrence indicator 0 indicates that there is no failure at this time stamp; whereas 1 indicates that there is a failure at this time stamp.

Figure 1B:
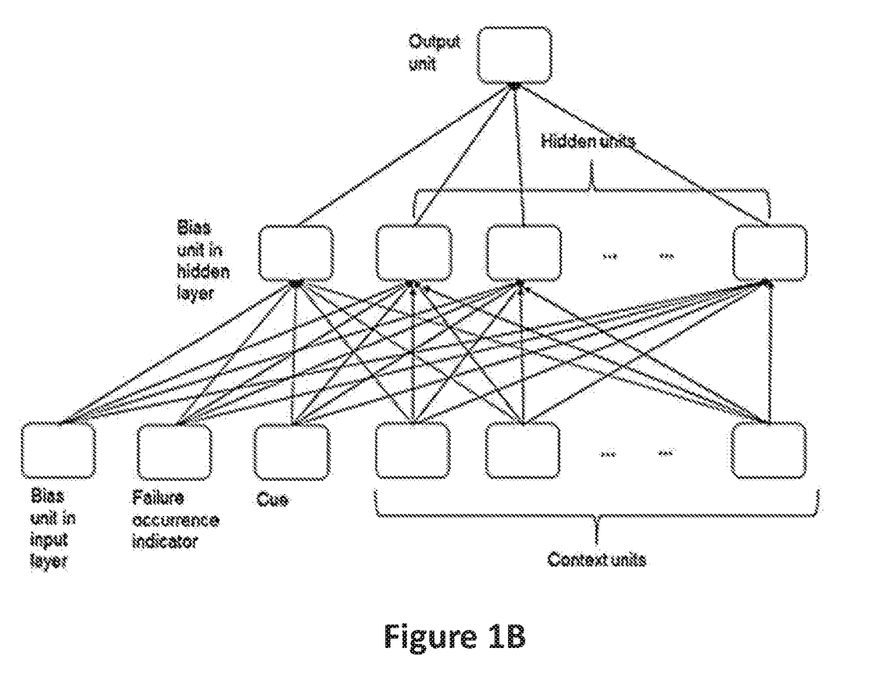
FIG. 1B shows a structure of a RNN used for machine failure prediction according to some embodiments of the invention.
Figure 1C:
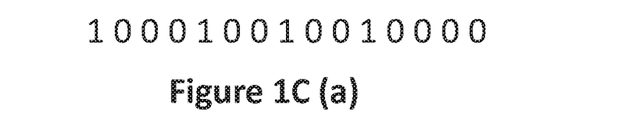

However, in practice, typically a simplified version of the input to RNN is used for machine failure prediction. In this simplified version, only the failure occurrence indicators are considered. That is to say, the input to RNN only includes an input sequence of failure occurrence indicators. FIG. 1B shows a structure of RNN trained using Back Propagation Trough Time (BPTT) for machine failure prediction according to embodiments of the invention. As shown in FIG. 1B, in addition to failure occurrence indicator, the input to RNN also includes a cue unit for each time stamp to help the network to remember long time gaps. Experiments have proven that use of cue units can reduce number of iterations for convergence of the network.

FIG. 1C (a) shows an example of a sequence of machine failure history. In embodiments of this invention, 0 in a sequence of machine failure history represents negative failure occurrence indicator, i.e. there is no machine failure; and 1 represents positive failure occurrence indicator, i.e. there is a machine failure. A basic memory depth value included in a sequence refers to the number of zeroes between two successive positive failure occurrence indicators. In this example, the sequence includes four basic memory depth values which are 3, 2, 2 and 4.

In embodiments of this invention, an elementary sequence refers to a machine failure sequence in which failures happen at a regular interval, i.e. all of the basic memory depth values included in an elementary sequence are same. Further, the sequence length of an elementary sequence is at least the minimum length required for prediction of machine failures. A composite sequence refers to a machine failure sequence in which failures happen in irregular intervals, i.e. composite sequence includes a plurality of different basic memory depth values.

It is well known by a person skilled in the art, when using RNN for machine failure prediction, an error measure method and an error threshold value is required to decide whether the RNN based training should be stopped, i.e. whether the difference between an input sequence and a predicted sequence is sufficiently small. Embodiments of the invention propose a vector distance based error measure and provide a solution for determining an error threshold value when the vector distance based error measure is to be used for modelling an arbitrary sequence using RNN for the purpose of predicting future machine failures.

In this solution, when the vector distance based error measure is to be used, the error threshold value for an arbitrary target sequence, especially a composite sequence including a plurality of different basic memory depth values, is determined based on both a standard deviation of the basic memory depth values included in the target sequence and an elementary error threshold value. The elementary error threshold value is retrieved from a pre-stored table based on an average value of the plurality of basic memory depth values. The pre-stored table is stored in a memory and includes a plurality of mappings wherein each mapping associates a predetermined depth value of an elementary sequence to an elementary error threshold value.

First, a vector distance based error measure proposed for machine failure prediction is explained with reference to FIG. 1C (a) and (b). In each epoch, RNN predicts the next failure occurrence indicator in the sequence by taking the input till the failure occurrence indicator at the current time stamp. Take the input sequence shown in FIG. 1C (a) as an example, predictions at the end of an epoch may look like the predicted sequence shown in FIG. 1C (b). As prediction is always based on some failure history, there is no any prediction for the first element.

In embodiments of the invention, to decide when the RNN training should be stopped or whether the RNN is converged, a vector distance between the input sequence and the corresponding predicted sequence at the end of each epoch is calculated as error measure according to the Equations (1) and (2):

$$\text{Vector distance} = 1 - \text{Cosine similarity} \quad (1)$$

$$\text{Cosine similarity} = \text{inner product between the input sequence and the predicted sequence/product of length of the input sequence and length of the predicted sequence} \quad (2)$$

For the example shown in FIG. 1C (b), cosine similarity for the input sequence and the predicted sequence is 0.997858 and accordingly the vector distance, i.e. the error at the end of the epoch, is 0.002142.

Figure 1D:
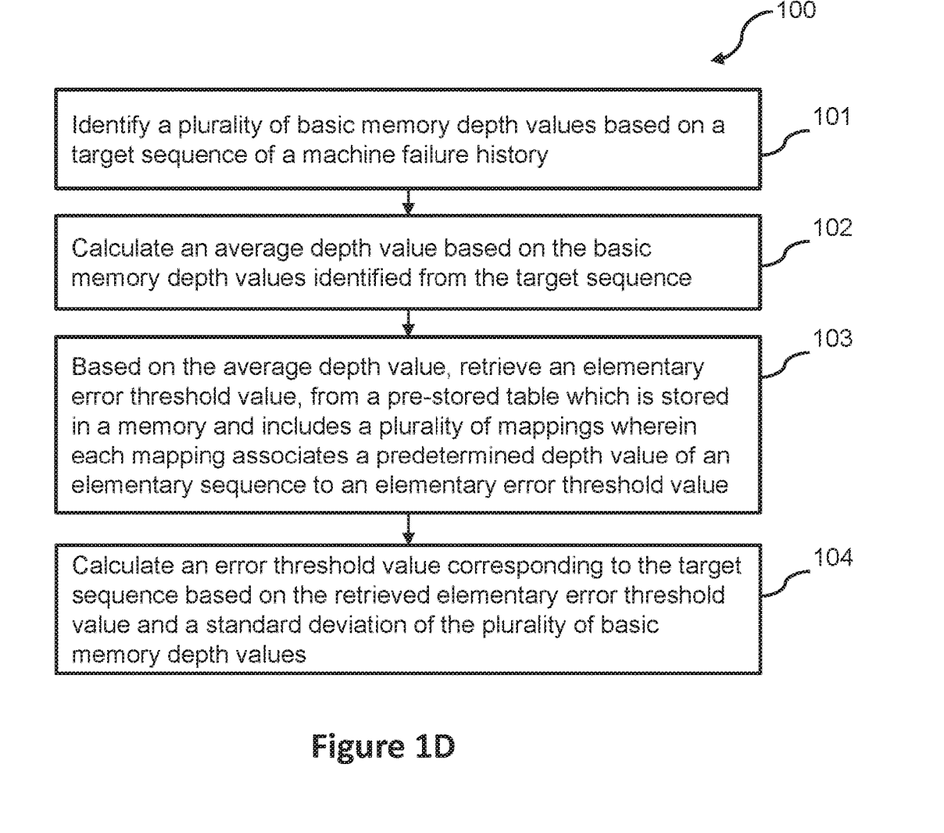
FIG. 1D shows a flowchart illustrating a method for determining an error threshold value for a target sequence for machine failure prediction according to some embodiments of the invention.

Next, with reference to FIGS. 1D to 1F, a method for determining an error threshold value for an arbitrary sequence when the vector distance based measure error is to be used for modelling the arbitrary sequence for the purpose of machine failure prediction will be explained. FIG. 1D shows a flowchart illustrating a method 100 for determining an error threshold value for a target sequence, i.e. an arbitrary sequence, for machine failure prediction according to some embodiments of the invention. The target sequence may be an elementary sequence or a composite sequence.

In block 101, a processor in a computer system identifies a plurality of basic memory depth values based on a target sequence of a machine failure history to be used for machine failure prediction.

Figure 1E:
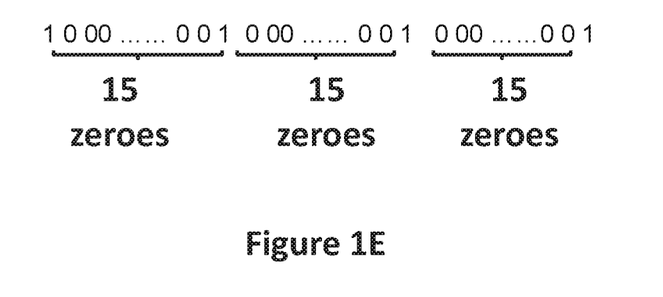
FIG. 1E and FIG. 1F show two examples of target sequences of machine failure history respectively.
Figure 1F:
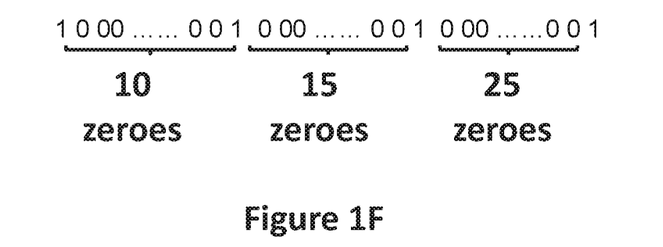

FIG. 1E and FIG. 1F show two examples of target sequences of machine failure history respectively. The target sequence shown in FIG. 1E includes three same basic memory depth values: 15, 15 and 15; whereas the target sequence shown in FIG. 1F includes three different basic memory depth values: 10, 15 and 25.

In block 102, the processor in the computer system calculates an average depth value based on the basic memory depth values identified from the target sequence.

For example, the average depth value for the target sequence in FIG. 1E is 15; whereas the average depth value for the target sequence in FIG. 1F is 50/3.

In block 103, the processor in the computer system retrieves an elementary error threshold value, based on the average depth value, from a pre-stored table which is stored in a memory and includes a plurality of mappings wherein each mapping associates a predetermined depth value of an elementary sequence to an elementary error threshold value.

In some embodiments of the invention, if the average depth value is equal to a depth value in the pre-stored table, the processor is configured to retrieve, from the pre-stored table, an elementary error threshold value corresponding to the average depth value as stored in the pre-stored table.

In some embodiments of the invention, if the average depth value is not equal to any depth value in the pre-stored table, the processor is configured to retrieve, from the pre-stored table, an elementary error threshold value corresponding to a depth value closest to the average depth value as stored in the pre-stored table.

The methods for generating the pre-stored table will be explained below with reference to FIGS. 2A-2D.

In block 104, the processor in the computer system calculates an error threshold value corresponding to the target sequence based on both the retrieved elementary error threshold value and a standard deviation of the plurality of basic memory depth values.

In some embodiments, the error threshold value for the target sequence may be calculated based on the following Equation (3):

$$Ec = Ee + C*\delta \quad (3)$$

Where Ec refers to the error threshold value corresponding to the target sequence; Ee refers to the elementary error threshold value retrieved from the pre-stored table; C refers to a predetermined constant coefficient and δ refers to the standard deviation of the plurality of basic memory depth values in the target sequence.

In some embodiments of the invention, the predetermined constant coefficient C may be $1/1800$.

The methods for generating the pre-stored table are now explained with reference to FIGS. 2A-2D.

Figure 2A:
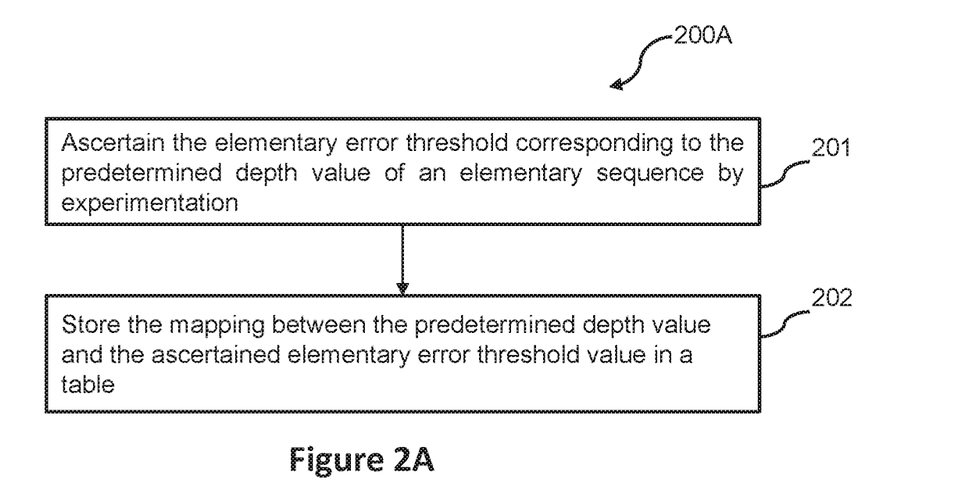
FIG. 2A is a flowchart illustrating a method for ascertaining an elementary error threshold value corresponding to a predetermined depth value according to some embodiments of the invention.

In some embodiments of the invention, the pre-stored table is generated by a method 200A as shown in FIG. 2A. FIG. 2A is a flowchart illustrating a method 200A for ascertaining an elementary error threshold value corresponding to a predetermined depth value according to some embodiments of the invention.

In block 201, a processor in a computer system ascertains an elementary error threshold value corresponding to a predetermined depth value of an elementary sequence by experimentation.

In block 202, the mapping between the predetermined depth value and the ascertained elementary error threshold value is stored in a table.

To increase ease and speed up the experimentation for ascertaining an elementary error threshold value corresponding to a depth value of an elementary sequence, especially a very large depth value, a vector distance method is proposed in some embodiments of the invention. With this vector distance method, the processor is configured to calculate a vector distance between the elementary sequence and a corresponding predicted sequence generated by replacing the 0 and 1 in the elementary sequence with two predetermined fixed values respectively, as an approximate value and then conduct experimentation based on the approximate value, i.e. the calculated vector distance to ascertain the elementary error threshold value corresponding to the predetermined depth value.

Figure 2B:
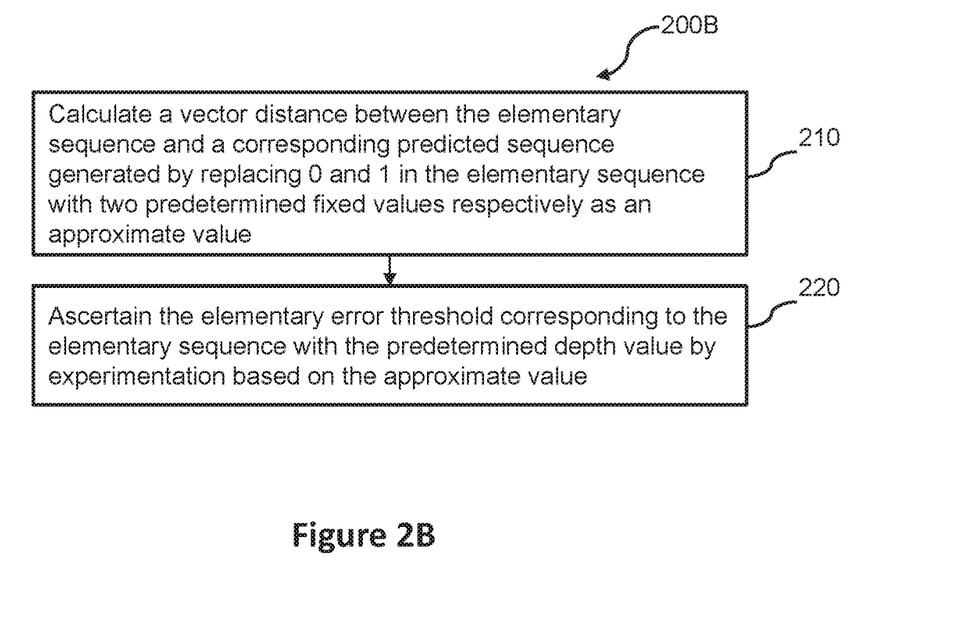
FIG. 2B is a flowchart illustrating a method for ascertaining an elementary error threshold value corresponding to a predetermined depth value according to some embodiments of the invention.

FIG. 2B is a flowchart illustrating a method 200B for ascertaining an elementary error threshold value corresponding to an elementary sequence with a predetermined depth value according to some embodiments of the invention.

In block 210, a processor in a computer system calculates a vector distance between the elementary sequence and a corresponding predicted sequence as an approximate value. The corresponding predicted sequence is generated by replacing 0 and 1 in the elementary sequence with two predetermined fixed values respectively, e.g. 0.026 and 0.974.

In block 220, the processor ascertains the elementary error threshold value corresponding to an elementary sequence with the predetermined depth value by experimentation based on the approximate value, i.e. the calculated vector distance.

Two examples are provided below to prove the effectiveness and efficiency of the proposed vector distance method for ascertaining an error threshold value corresponding to an elementary sequence.

Figure 2C:
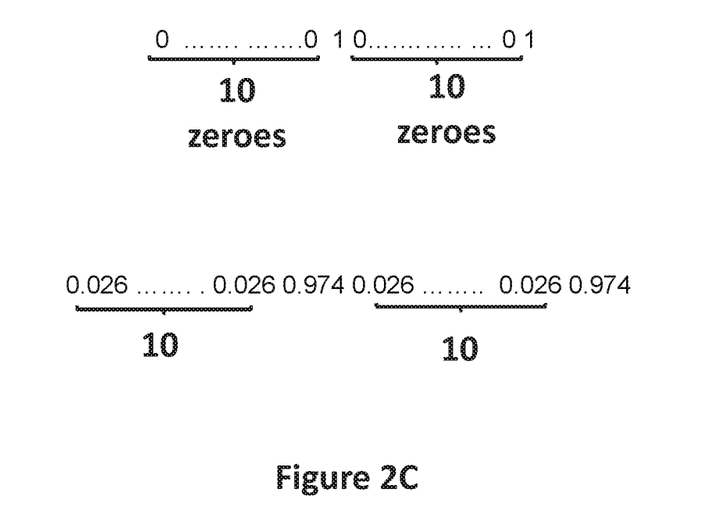
FIG. 2C shows a first example of an input sequence with a predetermined depth value of 10 and a corresponding predicted sequence.

FIG. 2C shows a first example of an input sequence with a predetermined depth value of 10 and a corresponding predicted sequence. In the corresponding predicted sequence, 0 has been replaced with 0.026 and the 1 has been replaced with 0.974. The vector distance between the input sequence and the predicted sequence can be calculated by substituting the values of the parameters into the Equations (1) and (2).

$$\text{Vector distance} = 1 - \text{Cosine similarity} = 1 - \frac{\sum_{i=1}^{n} E_i P_i}{\sqrt{\sum_{i=1}^{n} E_i^2} \sqrt{\sum_{i=1}^{n} P_i^2}}$$

wherein n=22, $E_i$=0 or 1; $P_i$=0.026 or 0.974. In this example, the calculated vector distance value is 0.003544. The error threshold value for an elementary sequence with a depth value of 10 obtained by experimentation is 0.004.

Figure 2D:
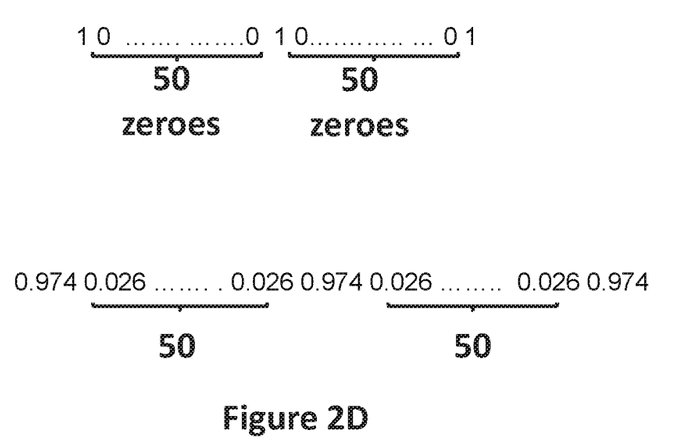
FIG. 2D shows a second example of an input sequence with a predetermined depth value of 50 and a corresponding predicted sequence.

FIG. 2D shows a second example of an input sequence with a predetermined depth value of 50 and a corresponding predicted sequence. In this example, the predicted sequence is generated by replacing the 0 and 1 in the input sequence with 0.026 and 0.974 respectively. The vector distance between the input sequence and the predicted sequence can be calculated by substituting the following values of the parameters into Equations (1) and (2):

n=103, $E_i$=0 or 1, $P_i$=0.026 or 0.974

In this example, the calculated vector distance value is 0.017352. The error threshold value derived from experimentation for an elementary sequence with a depth value of 50 is 0.01.

From the two examples explained above, it can be found that the calculated vector distance value is quite close to the actual error threshold value obtained through experimentation. Therefore, if the calculated vector distance value is used to conduct experimentation for ascertaining an error threshold value corresponding to the elementary sequence, the experimentation will become easier and faster.

Table 1 below illustrates some of the mappings between the depth values of elementary sequences and the elementary error threshold values, which are calculated using the method shown in FIG. 2B. Table 1 also shows the number of iterations/epochs required for convergence when calculating each of the elementary error threshold value. To compare the method proposed by embodiments of the invention and the mean absolute distance method, Table 1 also shows the elementary error threshold values and the corresponding number of iterations required for convergence of the sequence when the mean absolute distance method is used. In addition, for each elementary error threshold value, if the failure does not happen exactly at an expected slot but within a small distance from the expected slot, the slot where failure is predicted is also listed in the table for both methods.

TABLE 1

| | Using vector distance | | | Using mean absolute deviation | | |
|---|---|---|---|---|---|---|
| Depth Value | Elementary error threshold value | Epochs | Slot | Elementary error threshold value | Epochs | Slot |
| 10 | 0.004 | 1298 | | 0.02 | 91 | |
| 15 | 0.004 | 1391 | | 0.02 | 1834 | |
| 20 | 0.004 | 1669 | | 0.01 | 1800 | |
| 25 | 0.007 | 846 | | 0.02 | 454 | |
| 30 | 0.007 | 779 | | 0.02 | 510 | |
| 35 | 0.007 | 549 | | 0.02 | 373 | |
| 40 | 0.01 | 814 | | 0.02 | 652 | |
| 50 | 0.01 | 476 | | 0.015 | 1464 | |
| 55 | 0.02 | 4361 | | 0.008 | 10627 | |
| 60 | 0.02 | 566 | | 0.008 | 6688 | |
| 65 | 0.02 | 434 | | 0.008 | 3559 | |
| 70 | 0.02 | 12261 | | 0.008 | 8867 | |
| 75 | 0.022 | 4058 | 77 | 0.008 | 6265 | |
| 80 | 0.025 | 1838 | | 0.008 | 4218 | |
| 85 | 0.025 | 772 | | 0.008 | 742 | |
| 90 | 0.025 | 2903 | | 0.008 | 994 | |
| 95 | 0.026 | 4060 | 95 | 0.008 | 10136 | 93 |
| 100 | 0.026 | 3759 | | 0.008 | 18100 | |
| 105 | 0.03 | 601 | | 0.008 | 8666 | |
| 110 | 0.03 | 383 | | 0.008 | 357 | |
| 115 | 0.06 | 593 | | 0.008 | 2934 | |
| 120 | 0.07 | 29332 | | 0.008 | 9927 | 122 |
| 125 | 0.08 | 2112 | | 0.008 | 2337 | 125 |
| 130 | 0.08 | 4909 | | 0.008 | 7980 | 135 |
| 135 | 0.08 | 1131 | | 0.008 | 1939 | |
| 140 | 0.08 | 2792 | | 0.007 | 8105 | |
| 145 | 0.085 | 585 | | 0.0068 | 16282 | |
| 150 | 0.085 | 10657 | | 0.0068 | 4439 | |
| 155 | 0.085 | 4443 | | 0.0068 | 3423 | |
| 160 | 0.085 | 4728 | | 0.0065 | 5817 | |
| 165 | 0.085 | 6156 | | 0.0062 | 6946 | |
| 170 | 0.085 | 8740 | | 0.006 | 980 | |
| 175 | 0.085 | 1807 | | 0.006 | 3525 | 175 |
| 180 | 0.085 | 3420 | | 0.0055 | 16255 | 183 |
| 185 | 0.085 | 2912 | | 0.0055 | 1608 | |
| 190 | 0.085 | 1635 | | 0.005 | 7127 | |
| 195 | 0.085 | 2004 | | 0.0048 | 1294 | |
| 200 | 0.085 | 2615 | | 0.0048 | 16052 | |
| 205 | 0.085 | 1323 | | 0.0048 | 952 | |
| 210 | 0.085 | 1087 | | 0.0048 | 948 | |
| 215 | 0.085 | 1092 | | 0.0048 | 1083 | |
| 220 | 0.085 | 1257 | | 0.0044 | 17102 | |
| 225 | 0.085 | 1228 | | 0.0044 | 4611 | 225 |
| 230 | 0.085 | 1197 | | 0.0043 | 5335 | |
| 235 | 0.085 | 1339 | | 0.0043 | 3768 | |
| 240 | 0.085 | 964 | | 0.0042 | 2508 | |
| 245 | 0.085 | 1296 | | 0.004 | 7591 | |
| 250 | 0.085 | 1255 | | 0.0037 | 6478 | |

TABLE 1-continued

| Depth Value | Using vector distance | | | Using mean absolute deviation | | |
|---|---|---|---|---|---|---|
| | Elementary error threshold value | Epochs | Slot | Elementary error threshold value | Epochs | Slot |
| 255 | 0.085 | 961 | | 0.0037 | 19725 | 255 |
| 260 | 0.085 | 1248 | | 0.0036 | 1676 | |
| 265 | 0.085 | 1398 | | 0.0034 | 8224 | |
| 270 | 0.085 | 1228 | | 0.0034 | 9165 | |
| 275 | 0.085 | 1642 | | 0.0032 | 8744 | |
| 280 | 0.085 | 1166 | | 0.0031 | 5249 | |
| 285 | 0.085 | 1644 | | 0.0026 | 5315 | |
| 290 | 0.085 | 1370 | | 0.0023 | 39783 | |
| 295 | 0.085 | 1692 | | 0.0021 | 6153 | |
| 300 | 0.085 | 1572 | | 0.0019 | 26392 | |
| 305 | 0.085 | 1327 | | 0.0021 | 9377 | |
| 310 | 0.085 | 2305 | | 0.0018 | 13532 | |
| 315 | 0.085 | 746 | | 0.0018 | 14504 | |
| 320 | 0.085 | 1747 | | 0.0018 | 16672 | |
| 325 | 0.085 | 1164 | | 0.0014 | 968 | |
| 330 | 0.085 | 1292 | | 0.001405 | 21999 | |
| 335 | 0.085 | 1056 | | 0.0018 | 9790 | |
| 340 | 0.085 | 3554 | | 0.002 | 15701 | |
| 345 | 0.085 | 1522 | | 0.006 | 262 | |
| 350 | 0.085 | 2807 | | 0.0035 | 19 | |
| 355 | 0.085 | 1313 | | 0.0034 | 1674 | 357 |
| 360 | 0.085 | 3397 | | 0.0034 | 43 | |
| 365 | 0.085 | 1398 | | 0.0036 | 1344 | |
| 370 | 0.085 | 2558 | | 0.0036 | 973 | 370 |
| 375 | 0.085 | 5582 | | 0.0026 | 811 | |
| 380 | 0.085 | 13875 | | 0.004 | 4868 | |
| 385 | 0.085 | 4161 | | 0.00274 | 1285 | 385 |
| 390 | 0.085 | 6524 | | 0.003 | 1850 | |
| 395 | 0.085 | 6945 | | 0.003 | 798 | |
| 400 | 0.09 | 3261 | | 0.0028 | 1659 | |
| 405 | 0.09 | 1733 | 405 | 0.00215 | 2726 | |
| 410 | 0.09 | 4727 | | 0.00215 | 1722 | |
| 415 | 0.095 | 1505 | | 0.0055 | 901 | |
| 420 | 0.095 | 3418 | | 0.00213 | 2654 | 423 |
| 425 | 0.095 | 11954 | 428 | 0.002 | 4650 | |
| 430 | 0.095 | 641 | | 0.0026 | 1525 | 430 |
| 435 | 0.095 | 3695 | | 0.00232 | 14176 | |
| 440 | 0.095 | 13414 | 442 | 0.0029 | 23942 | 440 |
| 445 | 0.095 | 1871 | | 0.0037 | 6586 | 448 |
| 450 | 0.095 | 4835 | | 0.0036 | 1435 | |
| 455 | 0.1 | 807 | | 0.0055 | 222 | |
| 460 | 0.1 | 1133 | | 0.00311 | 1484 | 460 |
| 465 | 0.1 | 762 | | 0.00341 | 4803 | |
| 470 | 0.1 | 1966 | | 0.003 | 3134 | 472 |
| 475 | 0.1 | 4025 | | 0.0028 | 3006 | 475 |
| 480 | 0.1 | 1953 | | 0.0023 | 6560 | 480 |
| 485 | 0.15 | 5059 | | 0.0023 | 6608 | 487 |
| 490 | 0.15 | 421 | 492 | 0.0027 | 1129 | |
| 495 | 0.15 | 1551 | | 0.0021 | 11848 | 498 |
| 500 | 0.15 | 356 | | 0.0021 | 7144 | 500 |
| 505 | 0.15 | 794 | | 0.0021 | 15934 | |
| 510 | 0.15 | 405 | | 0.0021 | 9935 | 510 |
| 515 | 0.15 | 618 | | 0.0021 | 10108 | 517 |
| 520 | 0.15 | 456 | | 0.0021 | 6931 | 522 |
| 525 | 0.15 | 446 | | 0.0019 | 5550 | 527 |
| 530 | 0.15 | 141 | | 0.0019 | 12471 | |
| 535 | 0.15 | 5943 | | 0.0019 | 5410 | |
| 540 | 0.15 | 2000 | 542 | 0.0019 | 5955 | 540 |
| 545 | 0.15 | 3592 | | 0.0019 | 7827 | 545 |
| 550 | 0.15 | 2480 | | 0.0019 | 4468 | 552 |
| 555 | 0.15 | 3661 | | 0.00175 | 2102 | 555 |
| 560 | 0.15 | 32088 | | 0.0018 | 4266 | 560 |
| 565 | 0.15 | 4248 | | 0.00155 | 8532 | |
| 570 | 0.15 | 4624 | | 0.0019 | 6236 | |
| 575 | 0.15 | 9879 | | 0.0019 | 3082 | |
| 580 | 0.2 | 4225 | 580 | 0.0017 | 2600 | |
| 585 | 0.2 | 6884 | 587 | 0.0019 | 2142 | |
| 590 | 0.25 | 888 | 594 | 0.0019 | 5553 | 593 |
| 595 | 0.25 | 5405 | 595 | 0.0019 | 2136 | |
| 600 | 0.25 | 3655 | | 0.0022 | 692 | 600 |
| 605 | 0.25 | 486 | 608 | 0.0023 | 1153 | |
| 610 | 0.25 | 2537 | 610 | 0.0023 | 1096 | 612 |
| 615 | 0.25 | 1810 | 617 | 0.0023 | 1135 | 615 |
| 620 | 0.25 | 218 | 622 | 0.0022 | 1017 | 620 |
| 625 | 0.25 | 314 | | 0.0019 | 4139 | 627 |
| 630 | 0.25 | 1665 | 630 | 0.0019 | 2446 | |
| 635 | 0.25 | 309 | 635 | 0.0019 | 2248 | |
| 640 | 0.25 | 275 | | 0.0023 | 3115 | 642 |
| 645 | 0.25 | 233 | | 0.0023 | 2356 | 647 |
| 650 | 0.25 | 248 | | 0.0023 | 1644 | 650 |
| 655 | 0.25 | 79 | | 0.0021 | 1957 | 655 |
| 660 | 0.25 | 201 | 662 | 0.0021 | 5111 | 660 |
| 665 | 0.25 | 2745 | | 0.0021 | 3218 | 668 |
| 670 | 0.25 | 322 | 672 | 0.0021 | 2418 | 670 |
| 675 | 0.25 | 71 | 674 | 0.00163 | 2812 | |
| 680 | 0.25 | 208 | | 0.00163 | 3674 | 680 |
| 685 | 0.25 | 134 | 685 | 0.0019 | 2052 | |
| 690 | 0.25 | 146 | | 0.0019 | 1728 | |
| 695 | 0.25 | 9 | 693 | 0.00212 | 1180 | |
| 700 | 0.25 | 535 | 700 | 0.00212 | 2961 | 702 |
| 705 | 0.25 | 3858 | | 0.0019 | 2274 | |
| 710 | 0.25 | 405 | | 0.00212 | 1112 | 712 |
| 715 | 0.25 | 59 | 715 | 0.0019 | 1663 | 718 |
| 720 | 0.25 | 11 | 723 | 0.00212 | 1559 | |
| 725 | 0.25 | 82 | 725 | 0.00212 | 984 | 727 |
| 730 | 0.25 | 17 | 730 | 0.00172 | 2365 | |
| 735 | 0.25 | 18 | 734 | 0.0018 | 2267 | |
| 740 | 0.25 | 186 | | 0.0018 | 1196 | |
| 745 | 0.25 | 66 | | 0.0016 | 2310 | |
| 750 | 0.25 | 125 | | 0.00161 | 2109 | 753 |
| 755 | 0.25 | 24236 | 754 | 0.0016 | 943 | |
| 760 | 0.25 | 12776 | | 0.0019 | 480 | 760 |
| 765 | 0.25 | 2257 | 765 | 0.0022 | 204 | 767 |
| 770 | 0.25 | 1368 | 770 | 0.0022 | 1192 | 772 |
| 775 | 0.25 | 6227 | 775 | 0.0022 | 818 | |
| 780 | 0.25 | 1050 | | 0.0022 | 2745 | 780 |
| 785 | 0.25 | 348 | | 0.0022 | 1667 | |
| 790 | 0.25 | 588 | 793 | 0.0022 | 1395 | 792 |
| 795 | 0.25 | 950 | | 0.0022 | 4927 | 797 |
| 800 | 0.25 | 3188 | 800 | 0.0022 | 1695 | |
| 805 | 0.25 | 2497 | 807 | 0.0022 | 1110 | 807 |
| 810 | 0.25 | 5995 | 810 | 0.0023 | 1009 | |
| 815 | 0.25 | 681 | 818 | 0.0023 | 871 | |
| 820 | 0.25 | 520 | 820 | 0.00152 | 3575 | 820 |
| 825 | 0.25 | 526 | | 0.00171 | 1783 | 828 |
| 830 | 0.25 | 123 | | 0.00166 | 1445 | 830 |
| 835 | 0.25 | 13 | 839 | 0.0016 | 1454 | |
| 840 | 0.25 | 106 | 840 | 0.0018 | 1195 | |
| 845 | 0.25 | 79 | 847 | 0.00162 | 1617 | 847 |
| 850 | 0.25 | 70 | | 0.0023 | 1335 | |
| 855 | 0.25 | 99 | 855 | 0.0023 | 792 | |
| 860 | 0.25 | 98 | | 0.0019 | 1613 | 862 |
| 865 | 0.25 | 180 | | 0.00163 | 1475 | |
| 870 | 0.25 | 8380 | 869 | 0.0014 | 3250 | |
| 875 | 0.25 | 2337 | 875 | 0.00185 | 792 | |
| 880 | 0.25 | 274 | 882 | 0.0019 | 752 | |
| 885 | 0.25 | 357 | | 0.0021 | 918 | |
| 890 | 0.25 | 397 | 890 | 0.0017 | 6136 | |
| 895 | 0.25 | 929 | | 0.00139 | 6915 | 898 |
| 900 | 0.25 | 15765 | | 0.0014 | 6252 | 900 |
| 905 | 0.25 | 162 | | 0.00186 | 1438 | 905 |
| 910 | 0.25 | 169 | | 0.0019 | 123 | |
| 915 | 0.25 | 120 | | 0.00249 | 345 | 915 |
| 920 | 0.25 | 125 | | 0.00181 | 2756 | |
| 925 | 0.25 | 92 | 925 | 0.00227 | 1367 | 928 |
| 930 | 0.25 | 580 | | 0.00227 | 1977 | |
| 935 | 0.25 | 218 | 935 | 0.00227 | 871 | 935 |
| 940 | 0.25 | 204 | | 0.0018 | 1756 | 942 |
| 945 | 0.25 | 1711 | 945 | 0.0014 | 4046 | |
| 950 | 0.25 | 320 | 950 | 0.0018 | 3235 | 952 |
| 955 | 0.25 | 352 | | 0.0017 | 1671 | 957 |
| 960 | 0.25 | 10718 | | 0.0013 | 6012 | |
| 965 | 0.25 | 236 | | 0.0013 | 6336 | |
| 970 | 0.25 | 71 | 972 | 0.0016 | 1877 | 970 |

TABLE 1-continued

|  | Using vector distance | | | Using mean absolute deviation | | |
| --- | --- | --- | --- | --- | --- | --- |
| Depth Value | Elementary error threshold value | Epochs | Slot | Elementary error threshold value | Epochs | Slot |
| 975 | 0.3 | 317 | 977 | 0.0015 | 2672 | 975 |
| 980 | 0.35 | 94 | 986 | 0.0018 | 1742 | 983 |
| 985 | 0.35 | 126 | 987 | 0.0014 | 4808 | |
| 990 | 0.37 | 139 | 993 | 0.0017 | 1687 | |
| 995 | 0.37 | 136 | 998 | 0.0017 | 1437 | |
| 1000 | 0.37 | 130 | 1002 | 0.0015 | 2259 | |

Figure 2E:
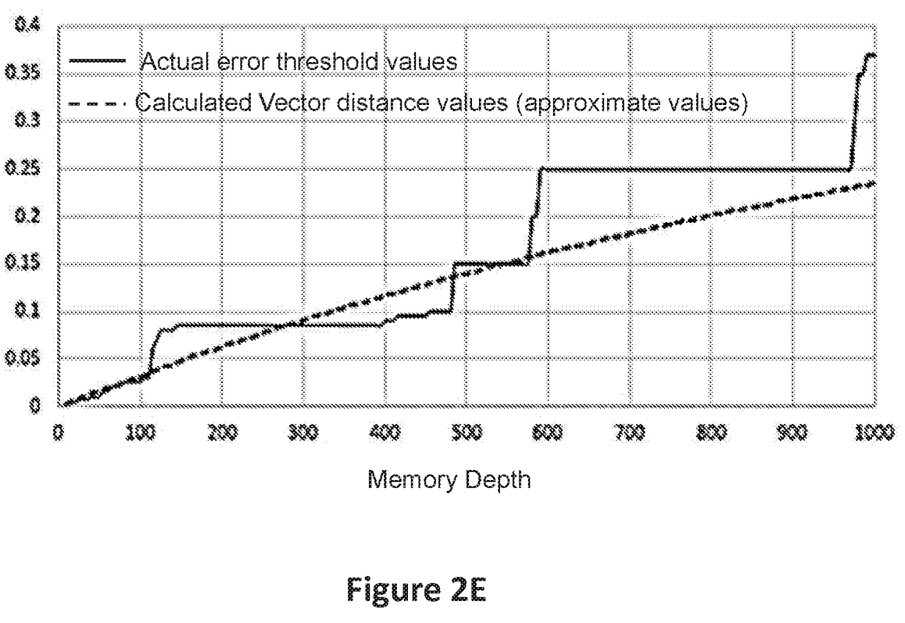
FIG. 2E is a plot diagram showing the actual error threshold values obtained by the vector distance method proposed in FIG. 2B and the calculated vector distance values against the depth values of elementary sequences from 0 to 1000.

Based on the results shown in Table 1, an analysis has been conducted to further prove that the vector distance method proposed in FIG. 2B is applicable to ascertain the elementary error threshold value corresponding to a predetermined depth value. FIG. 2E is a plot diagram showing the actual error threshold values ascertained by the vector distance method proposed in FIG. 2B and the calculated vector distance values, i.e. the approximate values, corresponding to the depth values of elementary sequences from 0 to 1000. In the diagram, the actual error threshold values are shown in solid line and the calculated vector distance values are shown in dash line. As well known by a person skilled in the art, using first principle, the vector distance values will increase with the increase of the depth values. The vector distance value corresponding to each of the depth values has been calculated using a computer program since it becomes difficult to manually calculate the vector distance value when the vector size of the elementary sequence becomes very big. As shown in the diagram, for small and medium depth values, the actual error threshold values and the calculated vector distance values do not differ much from each other, whereas for depth values of more than 550, the actual error threshold values are always higher than the corresponding calculated vector distance values. The analysis results prove the following two conjectures:

a. The calculated vector distance values linearly increase with the increase of the depth values of elementary sequences.
b. For depth values of more than 550, as the values in the actual predicted sequence become irregular, due to this irregularity, the actual error threshold values become higher than the approximate values, i.e. the vector distance values calculated based on predicted sequences which are generated by replacing 0 and 1 in the elementary sequence with two fixed values respectively.

Figure 2F:
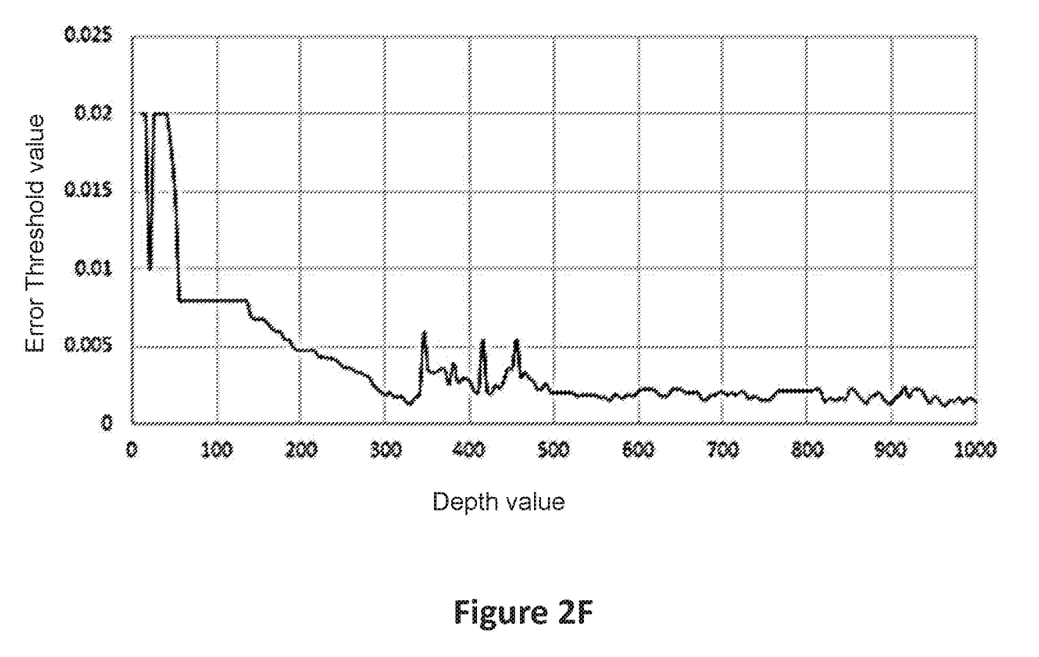
FIG. 2F is a plot diagram showing the elementary threshold values corresponding to the depth values ascertained by using the mean absolute deviation method as shown in Table 1.

FIG. 2F is a plot diagram showing the elementary threshold values corresponding to the depth values ascertained by using the mean absolute deviation method as shown in Table 1. From this diagram, it can be found that the elementary error threshold values calculated by the mean absolute deviation method change irregularly with the depth values of the elementary sequences compared to the vector distance method proposed in FIG. 2B. Further, as shown in FIG. 2E, the elementary error threshold values ascertained by the vector distance method proposed in FIG. 2B monotonically increase with the increase of the depth values, whereas as shown in FIG. 2F, the elementary error threshold values calculated by the mean absolute deviation method generally decrease with increase of the depth values, however, the results do not show monotonicity. Due to these two reasons, a person skilled in the art would understand that it is easier to ascertain elementary error threshold values using the vector distance method proposed by the embodiments of the invention than the mean absolute deviation method.

Figure 2G:
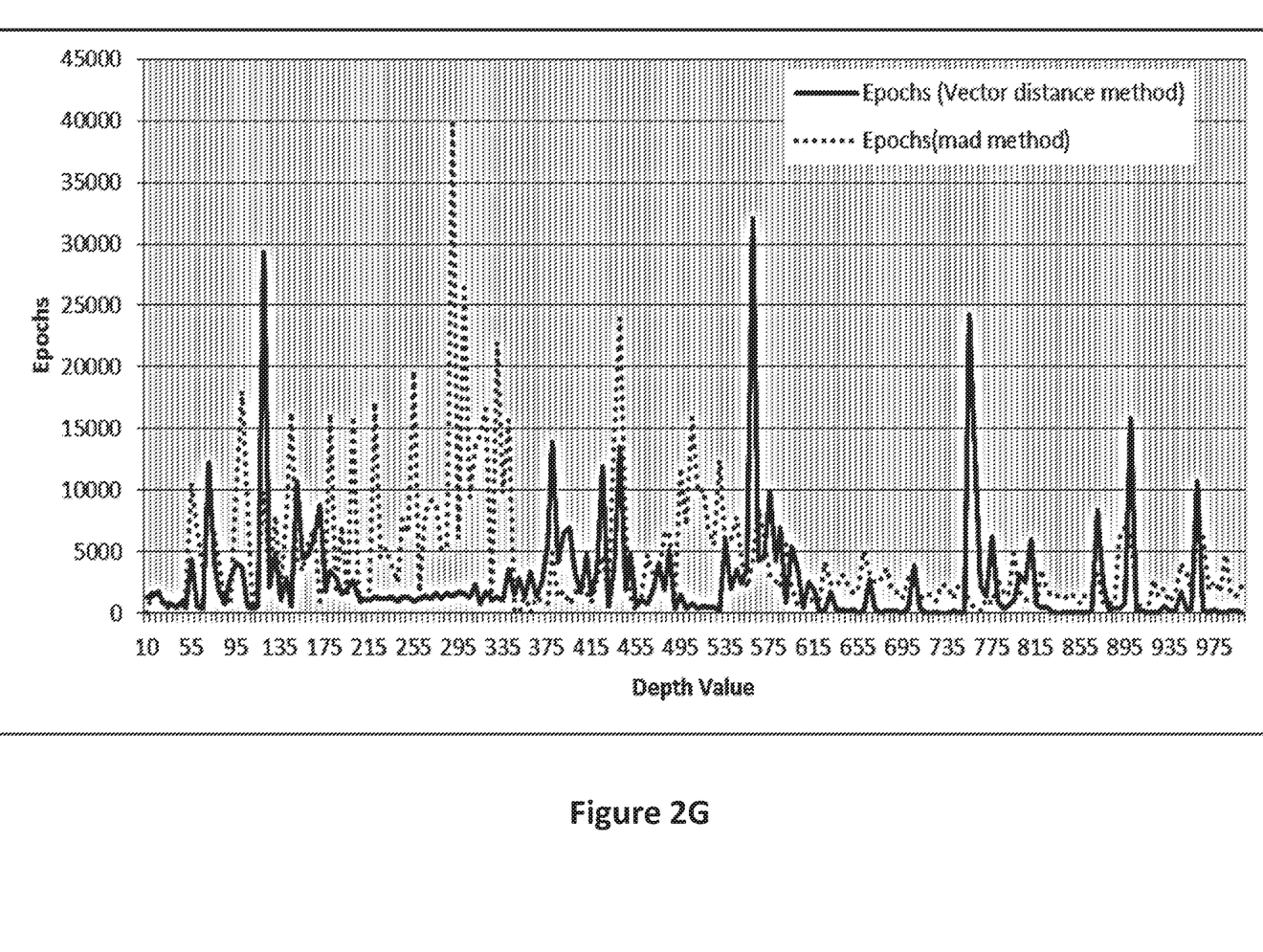
FIG. 2G is a plot diagram showing the number of iterations/epochs required for convergence of elementary sequences of different depth values shown in Table 1 using the vector distance method proposed in FIG. 2B and the mean absolute deviation.

FIG. 2G is a plot diagram showing the number of iterations/epochs required for convergence of elementary sequences of different depth values shown in Table 1 using the vector distance method proposed in FIG. 2B and the mean absolute deviation. It can be found from the diagram that to obtain same quality of prediction using the vector distance method proposed by embodiments of the invention, the number of epochs required for the vector distance method is less by 44% for elementary sequences when compared to the mean absolute deviation method.

Once the table of the mappings, e.g. the Table 1, has been stored in a memory communicably coupled to the processor for determining the error threshold value corresponding to a target sequence, the processor may determine the error threshold value corresponding to a target sequence based on the method shown in FIG. 1. Using the method proposed by embodiments of the invention and target sequences in FIGS. 1E and 1F as examples, the following paragraphs further explain the calculation of the error threshold value corresponding to the target sequence.

For the target sequence in FIG. 1E, the average depth value of the target sequence is 15; the elementary error threshold value corresponding to 15 retrieved from Table 1 is 0.004 and the standard deviation value of the basic memory depth values in the target sequence is 0. Accordingly, the error threshold value corresponding to the target sequence in FIG. 1E is 0.004+0/1800=0.004.

For the composite sequence in FIG. 1F, the average depth value is 50/3, and the elementary error threshold value retrieved from the pre-stored Table 1 corresponding to the depth value in the pre-stored table closest to 50/3 is 0.004. Accordingly, the error threshold value corresponding to the composite sequence in FIG. 1F is 0.004+6.2361/1800=0.0075.

Figure 3:
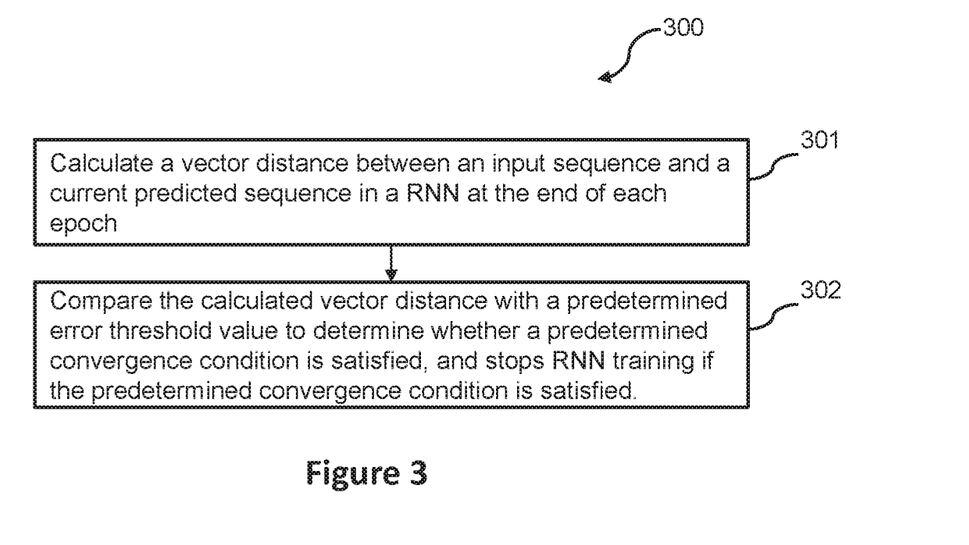
FIG. 3 is a flow chart illustrating a method for machine failure prediction when the vector distance based error measure is used for modelling an arbitrary sequence and an error threshold value has been determined by the method proposed by embodiments of the invention.

Once the error threshold value is determined for an arbitrary sequence of machine failure history, the vector distance based error measure can be used for modelling the arbitrary sequence to predict machine failures. FIG. 3 is a flow chart 300 illustrating the method for machine failure prediction when the vector distance based error measure is used for modelling an arbitrary sequence according to one embodiment of the invention.

In block 301, a processor in a computer system calculates a vector distance between an input sequence and a current predicted sequence in a RNN at the end of each epoch.

It is to be appreciated by a person skilled in the art that although in this embodiment, the vector distance, i.e. the error, is calculated at the end of each epoch, in other embodiments, it may be calculated after a predetermined time period, e.g. after a longer or a shorter time period.

In block 302, the processor in the computer system compares the calculated vector distance with a predetermined error threshold value to determine whether a predetermined convergence condition is satisfied, and stops RNN training if the predetermined convergence condition is satisfied.

In one example, the predetermined convergence condition may be that the calculated vector distance is less than or not greater than the predetermined error threshold value.

Table 2 below shows 14 composite sequences as well as the average depth values of the composite sequences, the elementary error threshold values corresponding to the average depth values from Table 1, the calculated error threshold values corresponding to the 14 composite sequences determined using the method proposed by embodiments of the invention and the number of iterations/epochs required for convergence of the 14 composite sequences.

To compare the method proposed by embodiments of the invention and the mean absolute deviation method, Table 2 also shows the number of iterations required for convergence when the mean absolute deviation method is used. In addition, for each composite sequence, if the failure does not happen exactly at an expected slot, but within a small distance from the expected slot, the slot where failure is predicted is also listed in the table for both methods.

Figure 4:
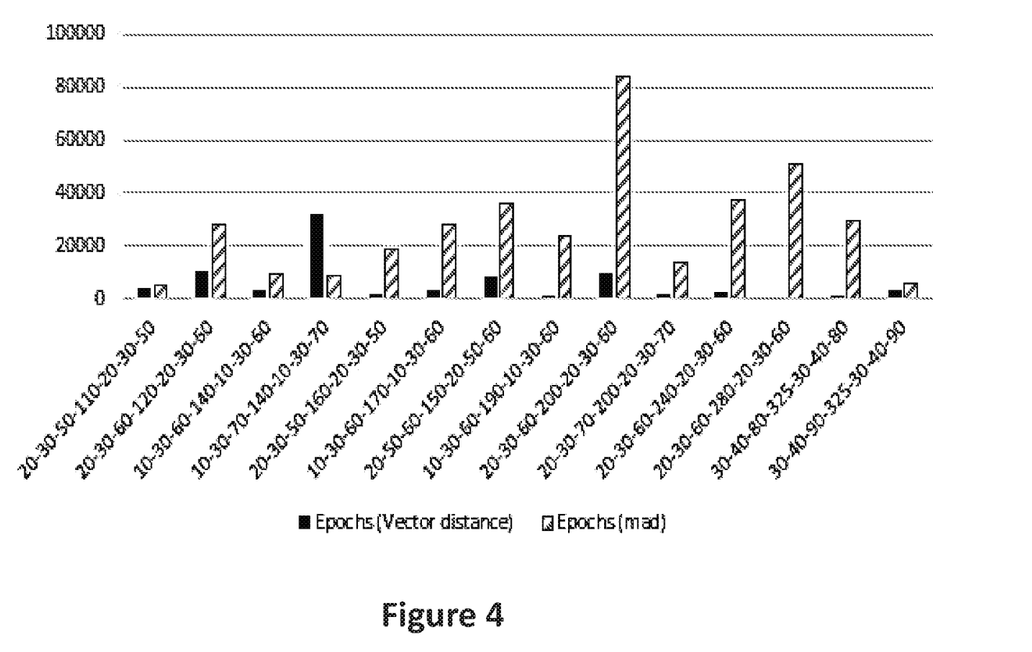
FIG. 4 is a bar chart showing the number of epochs required for convergence of the 14 composite sequences using the method proposed by some embodiments of the invention and the mean absolute deviation (mad) method.

FIG. 4 is a bar chart showing the number of epochs required for convergence of the 14 composite sequences using the method proposed by some embodiments of the invention and the mean absolute deviation (mad) method, i.e. Epochs (vector distance) and Epochs (mad) in the bar chart. It can be found from the bar chart that the epochs required for convergence of the composite sequences decrease by 77% by using the method proposed by embodiments of the invention compared to the mean absolute deviation method.

TABLE 2-

| Sl. No. | Composite Sequence | Average depth value | Elementary Error threshold valve corresponding to average depth value | Calculated Error Threshold valve corresponding to composite sequence | Iterations for vector distance | Slot | mad | Iterations for mad | Slot |
|---|---|---|---|---|---|---|---|---|---|
| 1 | 20-30-50-110-20-30-50 | 45 | 0.01 | 0.03 | 4450 | | 0.00865 | 4867 | |
| 2 | 20-30-60-120-20-30-60 | 50 | 0.01 | 0.03 | 10572 | | 0.0065 | 26318 | |
| 3 | 10-30-60-140-10-30-60 | 50 | 0.01 | 0.03 | 3531 | | 0.0078 | 9256 | 143 |
| 4 | 10-30-70-140-10-30-70 | 50 | 0.01 | 0.03 | 32042 | | 0.0077 | 8537 | |
| 5 | 20-30-50-160-20-30-50 | 50 | 0.01 | 0.04 | 2099 | 159 | 0.0057 | 19059 | |
| 6 | 10-30-60-170-10-30-60 | 55 | 0.02 | 0.05 | 3404 | 170 | 0.0079 | 28398 | 170 |
| 7 | 20-50-60-150-20-50-60 | 60 | 0.02 | 0.04 | 6714 | | 0.0067 | 36203 | |
| 8 | 10-30-60-190-10-30-60 | 55 | 0.02 | 0.05 | 1431 | 194 | 0.0072 | 23508 | |
| 9 | 20-30-60-200-20-30-70 | 60 | 0.02 | 0.05 | 9598 | 203 | 0.0048 | 84056 | |
| 10 | 20-30-70-200-20-30-70 | 65 | 0.02 | 0.05 | 1662 | 202 | 0.0084 | 13701 | |
| 11 | 20-30-60-240-20-30-60 | 65 | 0.02 | 0.06 (0.05) | 2827 | | 0.0073 | 37812 | |
| 12 | 20-30-60-280-20-30-60 | 70 | 0.02 | 0.07 | 594 | 284 | 0.0056 | 51349 | |
| 13 | 30-40-80-325-30-40-80 | 90 | 0.025 | 0.08 | 1437 | 330 | 0.01 | 29334 | |
| 14 | 30-40-90-325-30-40-90 | 90 | 0.025 | 0.08 | 3365 | | 0.008 | 5661 | 339 |

Table 3 illustrates 5 composite sequences as well as the average depth value of each composite sequence, the elementary error threshold value retrieved from Table 1, the error threshold value determined for each composite sequence by using the vector distance method of the invention, the epochs/iterations required for convergence of each composite sequence and the slot for each composite sequence if any.

TABLE 3

| Composite Sequence | Average depth value | Elementary Error corresponding to average depth | Error threshold value corresponding to the composite sequence | Iterations for vector distance | Slot |
|---|---|---|---|---|---|
| 20-30-70-100-130-20-30-70-100 | 65 | 0.02 | 0.04 | 61474 | 132 |
| 20-40-50-80-130-20-40-50-80 | 55 | 0.02 | 0.04 | 3038 | |
| 10-30-70-110-130-10-30-70-110 | 65 | 0.02 | 0.04 | 4401 | |

TABLE 3-continued

| Composite Sequence | Average depth value | Elementary Error corresponding to average depth | Error threshold value corresponding to the composite sequence | Iterations for vector distance | Slot |
|---|---|---|---|---|---|
| 10-40-60-90-150-10-40-60-90 | 60 | 0.02 | 0.04 | 18268 | |
| 10-40-70-120-150-10-40-70-120 | 70 | 0.02 | 0.04 | 22887 | |

It can be found from Table 3 that convergence is successfully detected by using the error threshold value determined by the method proposed in embodiments of this invention.

For experimentation with vector distance method proposed by embodiments of the invention and the mean absolute deviation method mentioned above, the learning schedule shown in Table 4 is used.

TABLE 4

| Vector distance | | Mean absolute deviation | |
|---|---|---|---|
| Error | Learning rate (eta) | Error | Learning rate |
| Initial | .2 | Initial | .2 |
| <.8 | eta/6 | <.04 | eta/6 |
| <.6 | eta/2 | <.03 | eta/2 |
| <.4 | eta/2 | <.025 | eta/2 |
| <.2 | eta/2 | <.02 | eta/2 |

In view of the description above about the method for determining an error threshold value corresponding to an arbitrary sequence, it is to be appreciated by a person skilled in the art that a system for determining an error threshold value when the vector distance based error measure is to be used for machine failure prediction, at least includes a first computer system having a first processor and a memory communicably coupled to the first processor. The memory is configured to store data to be executed by the first processor and the first processor is configured to perform the method for determining an error threshold value proposed in embodiments of the invention. The system may further include a second computer system having a second processor which is configured to perform the method for generating the per-stored table. In some embodiments of the invention, the first computer system and the second computer system may be provided as the same computer system and the first processor and the second processor may be provided as the same processor in the same computer system.

As will be appreciated from the above, embodiments of the invention propose a vector distance based error measure and provide a method for automate prediction of an error threshold value corresponding to an arbitrary sequence when the vector distance based error measure is to be used for machine failure prediction. In this way, the error threshold value corresponding to an arbitrary sequence can be calculated based on a standard deviation of the basic memory depth values included in a target sequence and an elementary error threshold value retrieved from a pre-stored table based on the average depth value of the basic memory depth values in the target sequence. Further, in some embodiments of the invention, the elementary error threshold value corresponding to a depth value of an elementary sequence may be ascertained based on a vector distance method to make the convergence of the network easier and faster.

With the solution proposed by embodiments of the invention, when the vector distance based error measure is used for machine failure prediction, the error threshold value corresponding to an arbitrary sequence can be determined quickly and properly, thereby the required time for convergence of the sequence would be reduced significantly so that the machine failures may be predicted within a reasonable time successfully. As mentioned above, using the method proposed in embodiments of the invention, the number of epochs required for convergence may be decreased by 77% on the average when compared with the mean absolute deviation method. Accordingly, the time for machine failure prediction may also be reduced. Further, the solution proposed by embodiments of the invention is a simple process and does not require significant additional computation since the calculation of vector distance is not a complex operation and error is only required to be checked at the end of each epoch.

Without the solution proposed in embodiments of the invention, continuous prediction of failures for a large number of machines having different patterns of failures, e.g. prediction faults across telecommunications and other network types, would not be possible since it is not obvious to a person skilled in the art that there is a relationship between error threshold values of elementary sequences and a composite sequence, i.e. the error threshold value for a composite sequence can be determined based on elementary error threshold value for an elementary sequence. Also it is not obvious to a person skilled in the art that error threshold value for a composite sequence would increase if the composite sequence becomes more irregular. With the solution proposed by embodiments of the invention, a large collection of machine failure sequence prediction can be performed successfully without human intervention.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

The invention claimed is:

1. A method for determining an error threshold value when a vector distance based error measure is to be used for machine failure prediction, the method comprising: inputting a plurality of basic memory depth values based on a target sequence to be used to calculate a machine failure prediction into a computer operable memory storage device through use of a processor connected within at least one computer system;
   an average depth value based on the plurality of basic memory depth values the calculation performed by the processor;
   retrieve an elementary error threshold value, a plurality of corresponding mappings and a corresponding predetermined depth value from a pre-stored data base table stored in a computer operable memory;
   inputting an elementary sequence of a machine failure sequence associated with a predetermined depth value based on the average depth value, wherein the elementary sequence includes a plurality of zeroes and a plurality of ones, said determining performed by the processor;
   selecting a first fixed value and a second fixed value through use of the processor;
   generating a predicted sequence of a machine failure by replacing the plurality of ones of the elementary sequence with the first fixed value and then replacing the plurality of zeroes with the second fixed value, said replacing performed by the processor;
   calculating an approximate value based on a vector distance between the elementary sequence and the predicted sequence, the determining performed by the processor;
   calculating an elementary error threshold value corresponding to the elementary sequence of the machine failure sequence with the predetermined depth value based on the approximate value, said calculating performed by the processor;
   generating an error threshold value corresponding to the target sequence based on both the determined elementary error threshold value and a standard deviation, represented as $\delta$, of the plurality of basic memory depth values by the processor;
   initiating training of a recurrent neural network based on the plurality of basic memory depth values;
   comparing the calculated vector distance with the predetermined error threshold after each epoch during training;
   continuing to train the RNN until the calculated vector distance is less than the predetermined error threshold; and
   stopping the training of the RNN when the calculated vector distance is less than the predetermined error threshold.

2. The method according to claim 1, wherein the average depth value and the predetermined depth value are a same value.

3. The method according to claim 1, wherein the average depth value and the predetermined depth value are a different value.

4. The method according to claim 1, wherein the error threshold value corresponding to the elementary sequence of the machine failure sequence with the predetermined depth value is based on a predetermined constant coefficient.

5. The method according to claim 4, wherein the predetermined constant coefficient is 1/1800.

6. The method according to claim 1, wherein determining, by the processor, an elementary error threshold value corresponding to the elementary sequence of the machine failure sequence with the predetermined depth value based on the approximate value is accomplished by experimentation.

7. The method according to claim 1, wherein the first fixed value is 0.974 and the second fixed value is 0.026.

8. The method according to claim 1, wherein the target sequence is a composite sequence which includes a plurality of different basic memory depth values.

9. A system for determining an error threshold value when a vector distance based error measure is to be used for machine failure prediction, the system comprising: a computer system having a processor and a at least one memory communicably coupled thereto, wherein the at least one memory is configured to store data to be executed by the processor, wherein the processor is configured to:
input a plurality of basic memory depth values based on a target sequence to be used for machine failure prediction into a computer operable memory through used of the processor;
select an average depth value based on the plurality of basic memory depth values;
generate an elementary sequence of a machine failure sequence associated with a predetermined depth value based on the average depth value, wherein the elementary sequence includes a plurality of zeroes and a plurality of ones through use of the processor;
receive a first fixed value and a second fixed value;
generating by the processor, a predicted sequence by replacing the plurality of ones of the elementary sequence with the first fixed value and replacing the plurality of zeroes with the second fixed value through use of the processor;
generate an approximate value based on measuring a vector distance between the elementary sequence and the predicted sequence;
determine an elementary error threshold value corresponding to the elementary sequence of the machine failure sequence with the predetermined depth value based on the approximate value;
determine an error threshold value corresponding to the target sequence based on the determined elementary error threshold value and a standard deviation of the plurality of basic memory depth values;
initiate training of a recurrent neural network based on the plurality of basic memory depth values;
compare the calculated vector distance with the predetermined error threshold after each epoch during training;
continue to train the RNN until the calculated vector distance is less than the predetermined error threshold; and
stop training the RNN when calculated vector distance is less than the predetermined error threshold.

10. The system according to claim 9, wherein the average depth value and the predetermined depth value are a same value.

11. The system according to claim 9, wherein the average depth value and the predetermined depth value are a different value.

12. The system according to claim 9, wherein the error threshold value corresponding to the elementary sequence of the machine failure sequence with the predetermined depth value is based on a predetermined constant coefficient and the standard deviation of the plurality of basic memory depth values in the target sequence.

13. The system according to claim 12, wherein the predetermined constant coefficient is 1/1800.

14. The system according to claim 9, wherein the first fixed value is 0.974 and the second fixed value is 0.026.

* * * * *